March 21, 1933.   P. C. GORDON   1,902,800
FLEXIBLE TRANSMISSION
Filed July 27, 1928   2 Sheets-Sheet 2
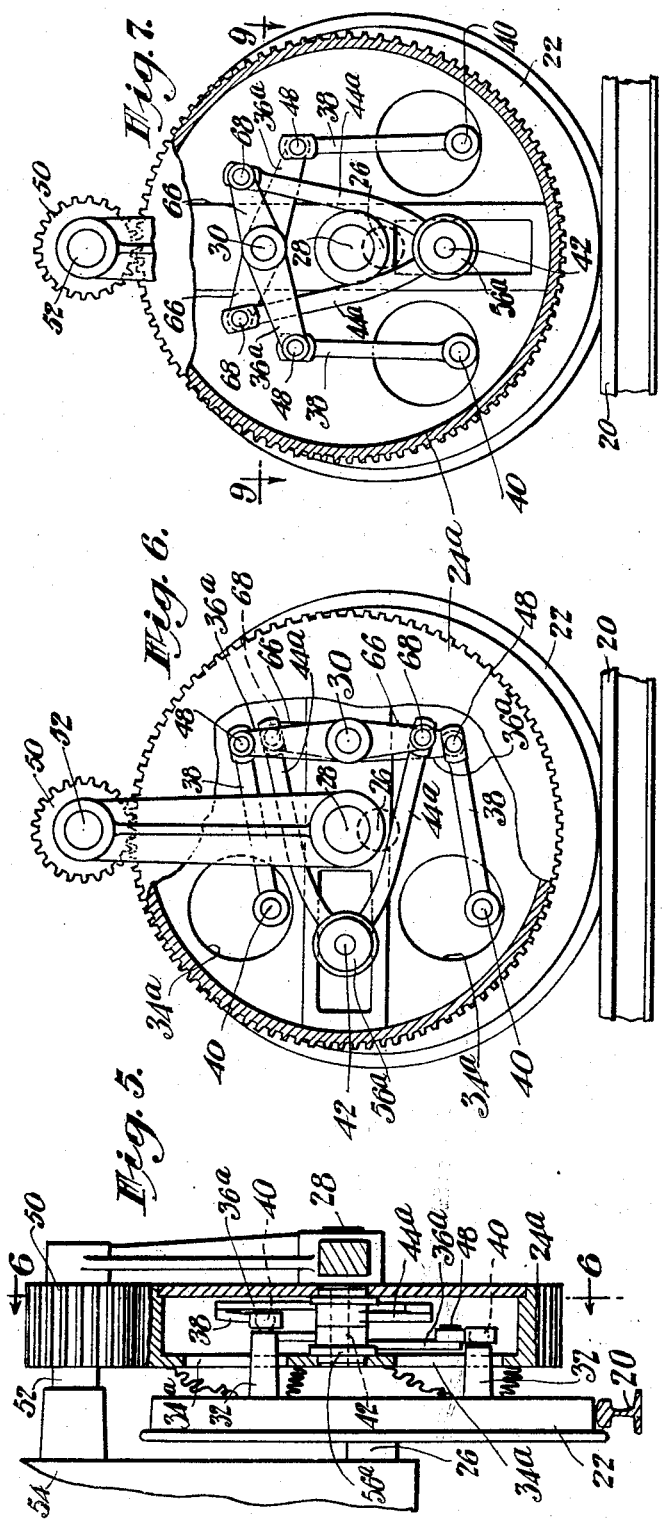
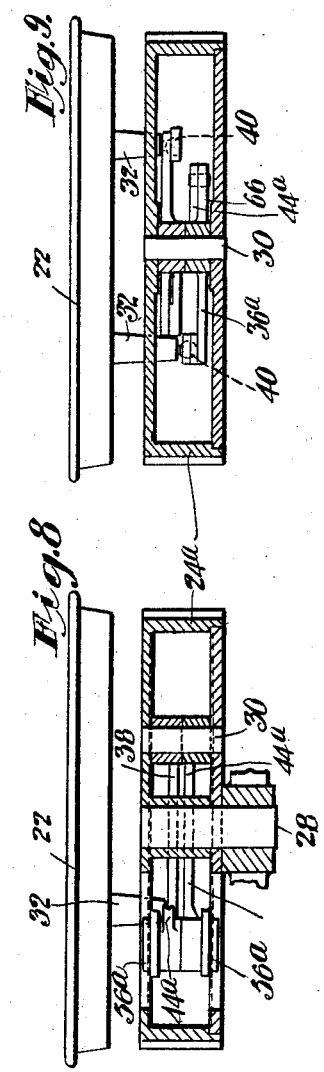
INVENTOR.
PHILIP C. GORDON
BY *Edmund G. Gordon*
HIS ATTORNEY.

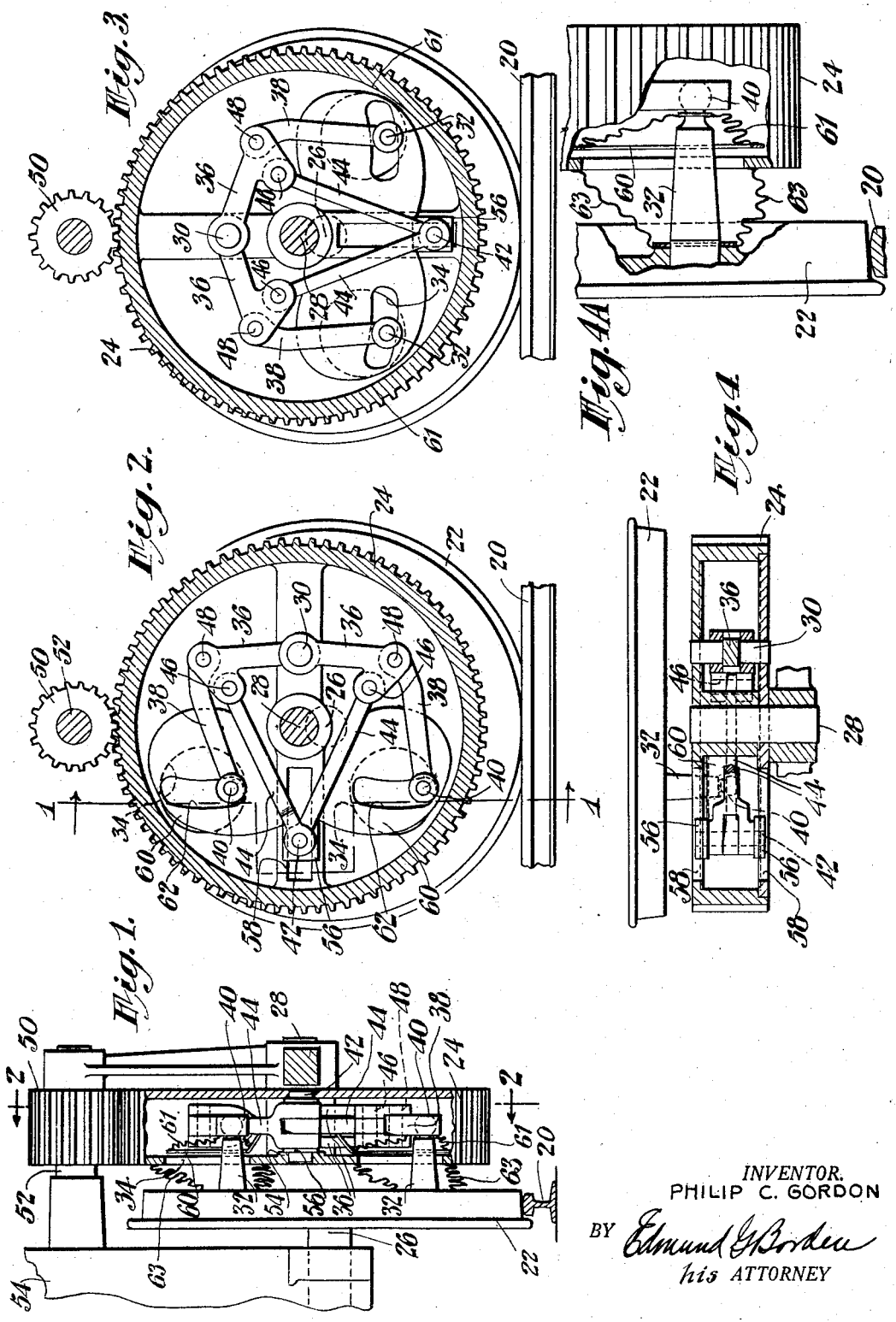

Patented Mar. 21, 1933

1,902,800

UNITED STATES PATENT OFFICE

PHILIP C. GORDON, OF NEW YORK, N. Y., ASSIGNOR TO DOHERTY RESEARCH COMPANY, OF NEW YORK, N. Y., A CORPORATION OF DELAWARE

FLEXIBLE TRANSMISSION

Application filed July 27, 1928. Serial No. 295,702.

The present invention relates to flexible transmissions and more particularly to flexible mechanical transmissions adapted for use on geared locomotives.

It is common practice to interpose gears between the motor and the driving wheels of electric and other locomotives, or automotive vehicles. As the motor must in general be spring-supported, it has been found necessary to introduce special transmissions between the gearing and the driving wheels of the locomotive or other vehicle. It will be seen that such transmissions operate under difficult conditions, having to transmit torque while the axes of the two rotating elements to which they are connected are rapidly changing their relative positions due to the action of the vehicle springs. Such transmissions are designed commonly for heavy loads and the spring movements of the vehicles are material. Moreover it has been found advantageous to mount the motor so that the driving gears shall be normally eccentric with respect to the driver wheels of the locomotives irrespective of the spring action. Consequently, difficulty has been encountered in obtaining a transmission for the purposes mentioned sufficiently accurate or correct in a mechanical sense so that the changes in eccentricity due to the springs shall be accommodated or compensated for within tolerable limits of error especially when superimposed on an initial normal eccentricity between the axis of rotation of the parts connected by the transmissions. It will be understood that a theoretical error in the mechanics of the apparatus causes changes in the relative speeds of the driving and driven members producing severe shocks and stresses in the mechanism. Springs have been inserted in certain transmission mechanisms to avoid excessive stresses and shocks due to mechanical errors, but the springs in themselves are often disadvantageous in causing oscillations and vibrations. Springs also add to the cost and upkeep of such mechanisms. In addition to this mechanical difficulty of a theoretical nature, it has been difficult to obtain transmissions for the purposes mentioned of desired ruggedness and simplicity and having good qualities of balance at high speeds.

It is the purpose of the present invention to provide flexible mechanical transmissions suitable for electric locomotives and other automotive vehicles which shall have a high degree of mechanical accuracy together with ruggedness, simplicity and good balancing characteristics.

Two specific embodiments of the present invention are illustrated in the drawings forming a part of the present specification. In said drawings Fig. 1 is an elevational view illustrating a driver or track wheel of a locomotive coupled to a driving gear by a flexible transmission in accordance with the present invention, parts being sectioned on line 1—1 of Fig. 2 for purposes of illustration;

Fig. 2 is a section taken on the line 2—2 of Fig. 1 looking in the direction of the arrows;

Fig. 3 is a section similar to Fig. 2 illustrating the relative positions of the parts when the driver of the locomotive has turned 90° from the position illustrated in Fig. 2;

Fig. 4 is a central sectional view of the mechanism appearing in Figs. 1, 2 and 3, the sectioned portions being cut on the horizontal central plane of the gear appearing in Fig. 2;

Fig. 4A is detail of a dirt excluding means;

Fig. 5 is an elevational view partly in section and similar to Fig. 1, but illustrating a different form of transmission mechanism;

Fig. 6 is a sectional view taken on the line 6—6 of Fig. 5 looking in the direction of the arrows;

Fig. 7 is a view similar to Fig. 6, but illustrating the relative positions of the parts after the driver wheel has turned 90° with respect to its position in Fig. 6;

Fig. 8 is a sectional view of the apparatus illustrated in Figs. 5, 6 and 7, the parts being illustrated in Fig. 8 in the same position as in Fig. 6 and the sectioned parts being cut along the horizontal central plane of the gear in Fig. 6; and Fig. 9 is a sectional plan view formed by cutting the gear of Fig. 7 along the horizontal plane 9—9 of Fig. 7.

Referring more particularly to Figs. 1–9: 20 indicates the track rail and 22 indicates the driver wheel of an electric locomotive, wheel 22 running on rail 20. The wheel 22 is driven from the large gear 24. The center of the driver wheel is indicated at 26 and the center of the gear wheel is indicated at 28. It will be understood that the parts are illustrated in the positions assumed when the locomotive is at rest or when the springs are in normal position. The transmission in accordance with the present invention is arranged to transmit torque from the gear wheel 24 to the track or driver wheel 22. The transmission comprises a driving pin 30 mounted on the gear 24. Two driven pins 32, 32 are fixed to the track wheel 22 and extend laterally through openings 34, 34 in the inner side wall of gear 22. Preferably, the outer ends of pins 32 are formed so as to comprise parts of ball and socket joints the purposes of which will more fully appear hereinbelow. Preferably, also the transverse central plane of the gear 24 intersects the centers of the ball-supporting ends of the pins 32. The driving torque of the vehicle is transmitted from the pin 30 to the pins 32 by a mechanism including a pair of arms 36, 36. The ends of arms 36 removed from the driving pin 30 are pivoted to links 38, 38 which connect in turn to the driven pins 32, 32, preferably by means of ball and socket joints 40, 40. The structure comprising the arms 36 and the links 38 is connected also to a pin 42. Pin 42 is carried on the gear wheel 24, but is mounted to move relatively to the gear wheel when the centers 26 and 28 alter their movement with respect to one another.

The pin 42 is connected to the arms 36 and links 38. For this purpose, links 44, 44 are provided which pivot to the pin 42 and which also are pivoted to the arms 36 and links 38. As illustrated, links 44 pivot to the arms 36 at the points 46, 46 while the arms 36 are pivoted to the main driving links 38 at the points 48, 48, points 46 and 48 being close together. While links 44 are illustrated as connected directly to arms 36 rather than to links 38, the invention is not limited to this arrangement.

The pin 42 is mounted to move relatively to the gear 24. In the arrangement illustrated, the pin 42 carries square blocks 56, 56 mounted to slide in the slots or guides 58, 58 in the side walls of the gear 24 whereby the pin 42 is restricted to movement along a radius of the gear 24. Movement of the pin 42, as thus provided for, permits the mechanism according to the present invention to accommodate the movements of the locomotive springs to prevent abnormal shocks to the parts of the mechanism. While the transmission mechanism as illustrated and previously described is not precisely accurate or correct in a strict mathematical and mechanical sense, the error produced by a spring movement in the present mechanism and the consequent abnormal stresses on the parts are considerably less than those produced in certain popular transmissions now in use.

As illustrated, the driving gear 24 is driven by a pinion 50 on the shaft 52 of a motor 54. It is assumed that motor 54 is an electric motor, but the invention is in nowise limited to an electric drive.

It will be seen that, as the gear 24 revolves and thereby revolves the pin 30 around the center 28, the pins 32 will be forced to follow the rotation of the gear 24. While the arms 36, 36 are freely pivoted on the driving pin 30, the reaction of one link 38 on one arm 36 is in the opposite direction around the pin 30 from that of the other link 38 on the other arm 36. The driving torque is thereby prevented from rotating the arms 36 around the pin 30 and the torque therefore is transmitted to the driven pins 32, 32 to rotate the track wheel 22.

The only movements of the arms 36 around pin 30 therefore are caused not by the driving torque but by the normal eccentricity between the centers 26 and 28 or by changes in such eccentricity due to the spring motion.

It will be noted by comparing Figs. 2 and 3 that a rotation of the gear 24 through an angle of 90° causes the arms 36 to rotate in an opposite sense about the pin 30 thereby moving the pin 42 to the outer end of its guide 58.

As illustrated, the pin 42 is on the opposite side of the pin 30 from the center 28 of the gear 24. The invention, however, is not limited to this arrangement, but it has been found that placing the pin 42 on the opposite side of center 28 from pin 30 promotes the balance of the parts and improves the running qualities of the transmission.

The ball and socket joints 40 at the ends of the pins 32, 32 are desirable to accommodate the relative movements of pins 32 and gear 24 caused by end play of the axle of the driver 22 and by rocking and swaying of the locomotive frame.

It will be seen that the gear 24 is illustrated in Fig. 1 as mounted on a frame outside of the track and of the driver 22. This arrangement is not new with applicant, but is one which has been found desirable in practice and attention is called to the fact that applicant's present drive is well adapted for use in this way.

It has been previously mentioned that the driven pins 32, 32 which transmit the torque from the links 38 to the track wheel 22 project into the interior of the hollow gear 24 through openings 34. It is necessary that means be provided to prevent, or at least retard, the entrance of dirt and foreign objects into the interior of gear 24 through the openings 34, 34. In accordance with the present invention means are provided for the purpose comprising light, thin plates 60, 60 fixed to the links 44 and extending laterally over the larger portion of the openings 34. Relatively narrow slots 62, 62 are cut in the plates 60 to accommodate relative movements of the pins 32 in the plates 60 caused by the revolution of the wheel 22. The apertures not covered by the plates 60 are then made tight by flexible leather pieces or boots 61 similar to bellows leathers which are fixed to the pins 32 and to the edges of the openings 62. While some flexible leather closures must be used in the arrangement in accordance with the present invention it will be seen that the arrangement of cover plates 60 is such as to reduce the size of the flexible leathers 61 to a minimum thereby minimizing the first cost and upkeep of such leathers, a point which has been found of practical importance in transmission mechanisms now in use.

It is permissible also to use boots 63 surrounding the openings 34 and pins 32 and extending between the track wheel 22 and gear 24 to further ensure against dirt or ballast entering gear 24. The plates 60 not only act as guards or covers for openings 34, but their weight falls in such a position as to improve the balance of the mechanism.

The second embodiment of the present invention disclosed herein is illustrated in Figs. 5, 6, 7, 8 and 9. The apparatus of the second embodiment of the invention employs a number of parts identical in form and function with those employed in the first embodiment of the invention. Such parts are given the same reference characters in all the figures.

In the second embodiment of the invention, the pin 42 is pivoted to a pair of links 44a, 44a. The second embodiment has arms 36a, 36a pivoted to driving pin 30 on gear 24a. The links 44a, instead of being connected to arms 36a intermediate the driving pin 30 and the pivots 48, are connected to extensions 66, 66 arms 36a and extensions 66 forming two levers each of which extends from one side of the driving pin 30 to the other. One end of each of such levers is pivoted at 48 to one of the driving links 38 and its other end is pivoted at 68 to one of the links 44a. In general it will be understood that the function of the links 44a is the same as that of the links 44 in the first embodiment of the invention. The pin 42 also has the same function as the first embodiment. As illustrated however, the pin 42 is mounted in rollers 56a, 56a instead of the square crosshead blocks 56 illustrated in Figs. 1-4. Roller or ball bearings may of course be interposed between the pin 42 and the member 56a.

The driving gear 24a illustrated in Figs. 5-9 inclusive is, in general, very similar to the driving gear 24 illustrated in Figs. 1-4 inclusive.

While the action of the transmission mechanism illustrated in Figs. 5-9 inclusive is very similar to that illustrated in Figs. 1-4 inclusive, the form illustrated in Figs. 5-9 has the advantage in obtaining even better static balance than the other form of apparatus. It will be noted that as the links 38 move in one direction from the position illustrated in Fig. 6 to that illustrated in Fig. 7 to accommodate the movement of the joints 40, the pin 42 and links 44a move in the opposite direction. Moreover, the extensions 66 move in the opposite direction from the arms 36a. The net result is that the center of gravity of the moving parts taken as a whole changes very little during rotation, irrespective of eccentricity between the gear wheel and the track wheel or due to relative changes in eccentricity of such parts.

In both the embodiments of the invention illustrated in the drawings, the pin 42 is mounted directly on the driving gear such as gear 24 or gear 24a instead of being mounted on the driven member such as the track wheel 22. It will be understood, however, that the present invention is not limited to the arrangement illustrated. Furthermore, while pin 42 is illustrated as mounted to move in radial slots or guides in the gear wheel 24 or 24a, the invention is not limited to a slot, or equivalent guide, for the pin 42 or to a radial or rectilinear movement of this pin. The pin 42 must, however, be guided in a definite path such that the pin 42 approaches closer to or is removed farther from pin 30 as the pin moves along its path.

It will be understood that leather boots and/or guard plates, similar to plates 60, may be used in connection with the form of apparatus illustrated in Figs. 5-9 inclusive as well as in connection with the form of apparatus illustrated in Figs. 1 to 4A inclusive but have been omitted in Figs. 5 to 9 for clarity of illustration.

Pins 32 of the second form of apparatus (Figs. 5-9) need not be of different lengths, but have been so shown for convenience in illustrating the links and arms.

The apparatuses above described have been referred to as heavy duty transmissions because they are adapted to heavy service, which is considered the most exacting. It will be understood, however, that the forms of apparatus above described are adapted for light drives as well as heavy. In particular, the form shown in Figs. 5-9 is well adapted to high speeds by virtue of its unusually good static and dynamic balance.

Having thus described my invention, I claim:

1. A flexible transmission comprising a driving pin, a pair of arms pivoted on said pin, a pair of driven pins, links pivoted to said driven pins and to said arms, a second pair of links pivoted to a common axis and to said pairs of links and arms, and means supporting said common axis and permitting it to move toward and away from said driving pin.

2. A flexible transmission as set out in claim 1 and in which the second pair of links are pivoted to the pairs of links and arms near the points of connection between the other pair of links and the arms.

3. A transmission as in claim 1 together with a wheel to which the driven pins are attached, the projections of the links of the second pair on a plane parallel to the plane of revolution of the parts of the transmission lying on opposite sides of the projection on said plane of the axis of revolution of the driving pin.

4. A transmission as set forth in claim 1 and in which the arms are of equal length and one link of each pair is equal in length to the other link of the same pair.

5. A transmission as set forth in claim 1, together with a hollow gear on which the driving pin is fixed, said gear having apertures therein for the admission of the driven pins, and plates fixed to said second pair of links and extending over said apertures to hinder the admission of dirt to said gear.

6. A flexible transmission comprising a driving pin, a pair of arms pivoted on said pin, a pair of driven pins, links pivoted to said driven pins and to said arms, a second pair of links pivoted to a common axis and to pivots rigidly connected to said arms, and means supporting said common axis to move in a given path and permitting it to move toward and away from said driving pin.

7. In a flexible transmission, a driving member and a driven member, a pair of arms pinned to said driving member, a pair of links pivoted upon said arms and upon said driven member, and a second pair of links pivoted upon said arms and together, the paths of motion of the ends of the first pair of links which pivot upon said driven member being within circles as projected on the driving member, the space between which is bisected by the path of travel of the joined ends of the second pair of links.

8. A flexible transmission with a driving member and a driven member, two arms swiveling on said driving member, four links each having an end swiveling upon said arms, the free ends of two of said links swiveling upon said driven member while the free ends of the other pair of links swivel on an element which moves upon said driving member.

9. A flexible transmission with a driving member and a driven member, two arms swiveling on said driving member, four links each having an end swiveling upon said arms, the free ends of two of said links swiveling upon said driven member while the free ends of the other pair of links swivel on an element which slides upon said driving member.

10. In a device of the class described, a driving member and a driven member, two points of attachment for the transmission of power between said members on each of said members, said two points of attachment on one of said members being fixed thereto and said two points of attachment on the other of said members being one fixed and the other free to move in a fixed path radially of the said other member.

11. In a device of the class described, a driving member and a driven member, said driving member having two arms attached thereto, a pair of links connecting said arms to said driven member, a second pair of links connecting said arms to a movable connection on the driving member, said movable connection being on the side of the center of the driving member opposite to the attachment of said arms to said driving member.

12. A flexible transmission comprising a driving pin, as in claim 1 and in which the pair of arms extend beyond the driving pin and the second pair of links is pivoted to the arms at points at opposite sides of the driving pin from the pivots between the pair of arms and the first pair of links.

13. A flexible transmission with a driving member and a driven member, two arms swiveling on said driving member, four links each having an end swiveling upon said arms, the free ends of two of said links swiveling upon said driven member while the free ends of the other pair of links swivel on an element which rolls upon said driving member.

14. A flexible transmission comprising a driving member and a driven member, two walking beam arms pinned to the driving member, two links connecting each of said arms to said driven member, two other links pinned to the opposite ends of said arms and to a common element controlled to move over a fixed path in the driving member.

In testimony whereof I affix my signature.

PHILIP C. GORDON.